United States Patent [19]

Jensen

[11] Patent Number: 4,621,931
[45] Date of Patent: Nov. 11, 1986

[54] METHOD APPARATUS USING A CAVITATING VENTURI TO REGULATE LUBRICANT FLOW RATES TO BEARINGS

[75] Inventor: Richard C. Jensen, Greensburg, Pa.
[73] Assignee: Elliott Turbomachinery Co., Inc., Jeannette, Pa.
[21] Appl. No.: 562,613
[22] Filed: Dec. 19, 1983
[51] Int. Cl.[4] .................... F16C 17/02; F16C 17/12; F16C 33/10
[52] U.S. Cl. .................... 384/114; 384/311; 384/399
[58] Field of Search ............... 384/100, 114, 116, 311; 137/565; 251/118; 138/44

[56] References Cited

U.S. PATENT DOCUMENTS

| | | | |
|---|---|---|---|
| 3,013,845 | 12/1961 | Loch | 308/9 |
| 3,606,910 | 9/1971 | Lombard et al. | 384/100 X |
| 3,698,774 | 10/1972 | Saugeot et al. | 308/9 |
| 3,891,283 | 6/1975 | Pruvot | 308/5 R |
| 3,894,562 | 7/1975 | Moseley, Jr. et al. | 138/44 |
| 3,917,365 | 11/1975 | Jenness | 384/311 X |
| 4,306,754 | 12/1981 | Kraus | 308/9 |
| 4,320,926 | 3/1982 | Heinemann et al. | 308/9 |
| 4,465,383 | 8/1984 | Heinemann | 384/116 X |

OTHER PUBLICATIONS

Richard Binder, *Fluid Mechanics*, 2nd ed., 1949, pp. 308-312.
Streeter and Wylie, *Fluid Mechanics*, 7th ed., 1958, pp. 403-406.
Vennard, *Elementary Fluid Mechanics*, 3rd ed., 1954, pp. 390-392.

*Primary Examiner*—Stuart S. Levy
*Assistant Examiner*—Lynn M. Sohacki
*Attorney, Agent, or Firm*—Robert P. Hayter

[57] ABSTRACT

A method and apparatus for regulating the flow of liquid lubricant to hydrostatic bearings is disclosed. A cavitating venturi is utilized to regulate the volume flow rate of liquid lubricant supplied to a bearing. The cavitating venturi acts to provide a constant volume flow rate of liquid lubricant relatively independent of system flow resistance and feed pressure to the bearing.

3 Claims, 4 Drawing Figures

METHOD APPARATUS USING A CAVITATING VENTURI TO REGULATE LUBRICANT FLOW RATES TO BEARINGS

BACKGROUND OF THE INVENTION

1. Field of the Invention

The present invention relates to bearing systems for supporting shafts in large turbomachinery. More specifically, the present invention relates to the use of a cavitating venturi to control the volume flow rate of lubricant independent of downstream pressure conditions.

2. Description of the Prior Art

Large turbomachinery often includes a large and heavy shaft or rotor supported on a shaft which is mounted in a bearing. In order to commence rotation of a very heavy rotating device, a large torque is required to overcome frictional forces. The shaft in such instances settles on the bearing surfaces and due to its massive weight requires a large startup torque and a large torque to accelerate from low speeds. Additionally, the hydrodynamic lubrication systems designed to provide an oil film about the shaft between the shaft and the bearing during operation at design speeds are not present. The shaft must typically reach a minimum operating speed before lubricant is evenly distributed and an oil film established.

One means of reducing startup torque is to literally jack the shaft from the bearing by pumping oil or other liquid lubricant under pressure through the bearings to create an oil film between the bearing and the shaft. Once the shaft is jacked off the bearing surface, the frictional forces are greatly reduced and the shaft may be rotated with a minimum of effort.

In a typical bearing support system, numerous bearing locations are provided for a large shaft. The lubricant supply system may have a common reservoir and a pump for pressurizing the lubricant to distribute it about the bearing system. Each bearing would be connected to receive liquid lubricant from the pump.

Previous devices have attempted to regulate the volume flow of lubricant to each bearing by using either a capillary tube or a sharp edged orifice to create a flow restriction. One of the problems with either a capillary or a sharp edged orifice is that the volume flow rate therethrough is dependent upon the downstream pressure. Hence, if the particular bearing has a high flow resistance, the feed pressure to the capillary or sharp edged orifice will increase and the volume flow rate will decrease. On the other hand, should there be a reduced flow resistance at the bearing then the volume flow rate through either the capillary or the sharp edged orifice will increase.

Typically, the reservoir of liquid lubricant and the pump size for supplying the liquid lubricant are limited such that the overall quantity of lubricant supplied to the bearing system is limited. If one or more particular bearings is allowed to draw excess lubricant this may either drain the reservoir preventing sufficient lubricant being supplied to other sources or may act to starve one bearing relative to another.

To effectively utilize lubricant for jacking the shaft off the bearing, it is necessary to supply the proper volumetric rate of lubricant flow to each bearing location. A desired volume flow rate may be selected for each location such that lubricant may be supplied at a lower feed pressure and still yield a constant flow response over a wide downstream resistance variation. In a system with each bearing receiving lubricant independently of all others, it is desirable to prevent the flow rate to any bearing from changing even if a lubricant supply to one bearing were to be increased by the downstream resistance dropping to zero.

As disclosed herein, a cavitating venturi is utilized to effect a constant volume flow rate of liquid lubricant through the venturi relatively independent of the system resistance. The cavitating venturi acts to allow a predetermined volume flow rate to pass therethrough relatively independent of the downstream resistance.

The present invention is described relative to the use of a cavitating venturi to regulate and balance the volume flow rates to numerous bearings within a bearing system for effecting essentially hydrostatic operation. This valve could also be used in a hydrodynamic mode during which the shaft is operating at design speeds to regulate the volume flow rate of lubricant being supplied at any particular location.

SUMMARY OF THE INVENTION

An object of the present invention is to provide lubricant under pressure to a bearing support system.

A further object of the present invention is to incorporate a cavitating venturi in a liquid lubricant supply line to regulate the volume flow rate of lubricant relatively independent of downstream conditions.

A still further object of the present invention is to provide lubricant feed system which acts to supply lubricant to all the bearings regardless of flow characteristics of any particular bearing.

It is a yet further object of the present invention to provide a method of controlling the volume flow rate of liquid lubricant to a bearing relatively independent of lubricant feed pressure.

It is a still further object of the present invention to provide an economical, efficient, reliable and long lasting lubricant feed system employing a cavitating venturi for regulating liquid lubricant flow.

Other objects will be apparent from the description herein and the appended claims.

The preceeding objects are achieved according to the preferred embodiment by the provision of a feed system for supplying liquid lubricant at constant flow rates to reduce startup and low speed shaft torque in turbomachinery. At least one hydrostatic bearing for supporting a shaft is provided. Additionally, means for supplying liquid lubricant under pressure and a cavitating venturi connected to receive liquid lubricant from the means for supplying liquid lubricant and for discharging a desired volume flow rate of lubricant to the bearing for supporting the shaft are utilized. A series of cavitating venturis may be utilized to assure liquid lubricant supply to each bearing.

DESCRIPTION OF THE PREFERRED EMBODIMENT

The embodiment of the invention described herein is for use in regulating lubricant feed flow rates for hydrostatic bearings for use in jacking a shaft off its bearings for reducing startup torque. It is to be understood that apparatus incorporating a cavitating venturi may be equally used in other types of bearings and for other purposes. It is additionally to be understood that this invention has applicability, regardless of the quantity of bearings to which lubricant is supplied and the relative locations of the bearing support system.

Figure 1:
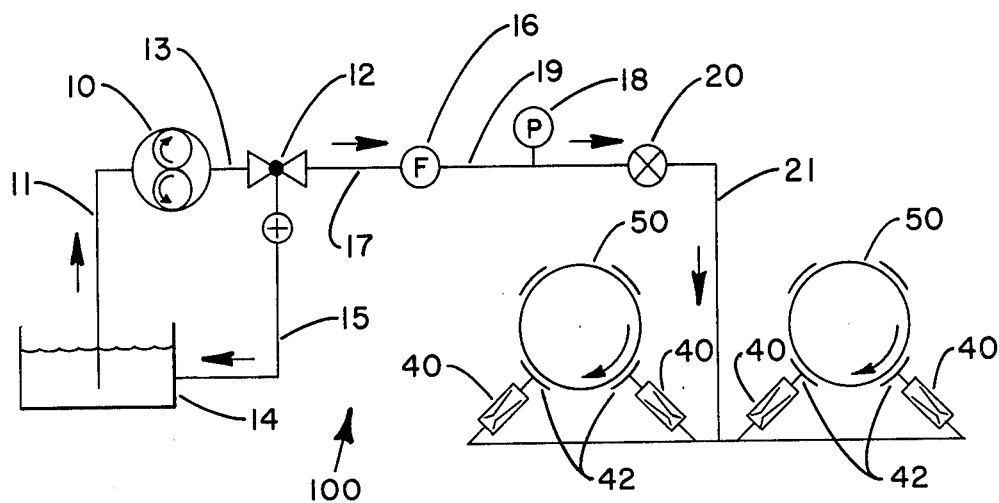
FIG. 1 is a schematic diagram of a lubricant feed system.

Referring now to FIG. 1 there may be seen a schematic diagram of a lubricant feed system 100. Lubricant, such as oil, is maintained within oil sump 14. Lubricant is pumped from the oil sump by being drawn through line 11 to pump 10. The pump discharges the lubricant through line 13 through pressure relief valve 12, through line 17 to filter 16, through line 19 in communication with pressure gauge 18 and therefrom through valve 20 to line 21. Pressure relief valve 12 acts to allow lubricant to flow through line 15 to return to oil sump 14 should the pressure exceed a predetermined limit.

Line 21 is connected to deliver lubricant to four separate cavitating venturis, each referenced by the numeral 40. The lubricant flows through the cavitating venturis to bearing pockets located in bearing pads 42. Shaft 50 is shown mounted for rotational movement adjacent to but spaced from the bearing pads.

When the shaft is at rest it drops downward and is physically located on bearing pads 42. In order to start the turbomachine including shaft 50 liquid lubricant is supplied by pump 10 to the cavitating venturis 40. Each cavitating venturi acts to allow a selected flow rate of lubricant therethrough essentially regardless of bearing feed pressure and system resistance. This lubricant builds up in pockets in the bearing pads and eventually acts to displace shaft 50 upwardly creating a lubricant film between the bearing surfaces upon which the shaft has been resting and the shaft itself. Hence, the shaft may thereafter be started with a minimum of torque.

Figure 2:
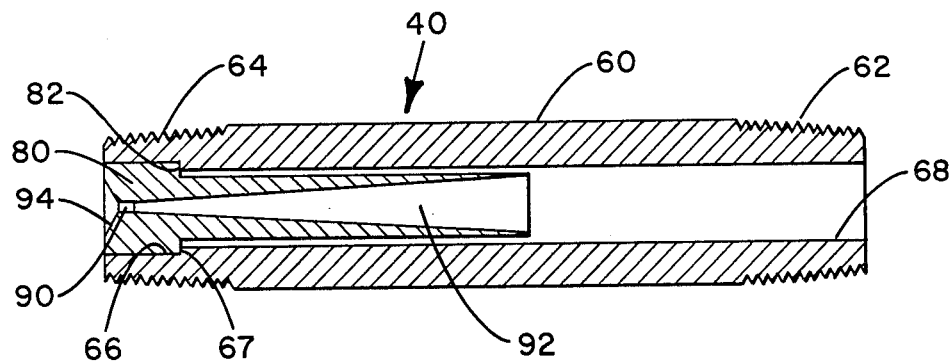
FIG. 2 is a cross-sectional view of a cavitating venturi.

FIG. 2 is a sectional view of a cavitating venturi. Cavitating venturi 40 is shown having a tube 60 making up the exterior body of the cavitating venturi and acting to define passageway 68 therethrough. External threads 62 and 64 are provided at opposite ends of the cavitating venturi to promote fastening within the lubricant feed system. Tube 60 additionally defines a tube bore 66 of an expanded diameter into which the venturi 80 may be received.

Venturi 80 has a wider end portion which includes an abutment face 82 which, when inserted within the passageway of tube 60, acts to engage end surface 67 of tube bore 66.

Venturi 80 acts to define an inlet cone 94, throat 90 and discharge cone 92, respectively. The flow of liquid lubricant is from left to right entering through the inlet cone which defines an opening decreasing in cross-sectional area to the throat portion 90. At throat 90, the cross-sectional area of the opening through the venturi is at a minimum. Thereafter, through discharge cone 92, the opening through the center of the venturi expands allowing the lubricant to decrease in velocity and undergo a pressure drop.

Within discharge cone 92 and downstream of throat 90 cavitation may occur. Cavitation is a rapid, almost explosive, change in phase from liquid to vapor which occurs whenever the absolute pressure in a flowing liquid drops by hydrodynamic means to or below a critical value. Under usual circumstances, a critical pressure is the vapor pressure or slightly below. Cavitation occurs as minute vapor bubbles form traveling gas filled cavities in the lubricant. These gas filled cavities act to isolate the throat of the venturi from downstream pressure changes such that the flow resistance downstream from the venturi and the pressure changes due to flow resistance are not communicated upstream to the throat or the inlet cone portion of the venturi. Hence, the volume flow rate of liquid lubricant through the venturi is maintained constant relatively independent of the downstream conditions. The changes in downstream resistance merely act to change the amount of liquid which changes to vapor in the venturi. This vapor is, of course, recondensed in the lubricant system only being vapor momentarily within the venturi.

Figure 3:
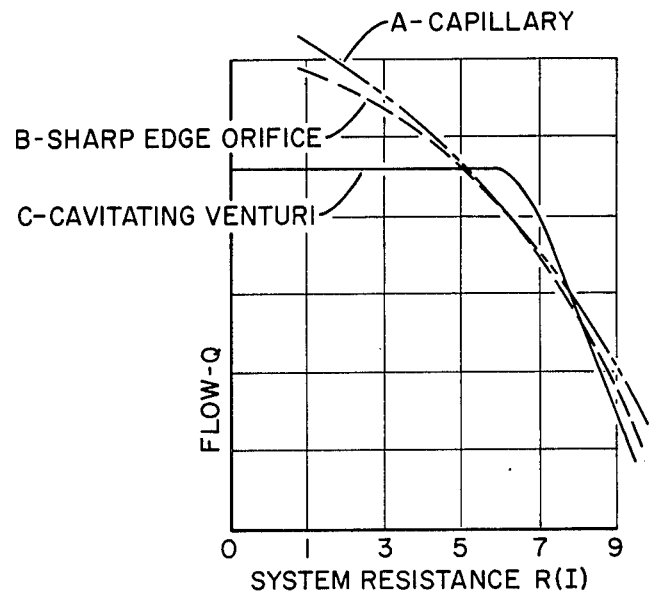
FIG. 3 is a graph of system resistance versus flow rates for a cavitating venturi, a sharp edged orifice and a capillary.

FIG. 3 is a graph with system resistance R(I) being the ordinate and flow Q being the abscissa. Lines are drawn for a capillary tube, a sharp edged orifice and a cavitating venturi to compare the flow rates through each relative to system resistance. The line labeled A is drawn for a capillary, B for a sharp edged orifice and C for a cavitating venturi. It can be seen from the graph shown in FIG. 3 that for both the sharp edged orifice and the capillary the flow therethrough changes significantly relative to the system resistance. On the other hand it may be seen for the cavitating venturi that the flow is maintained relatively constant for a wide range of system resistance conditions.

Figure 4:
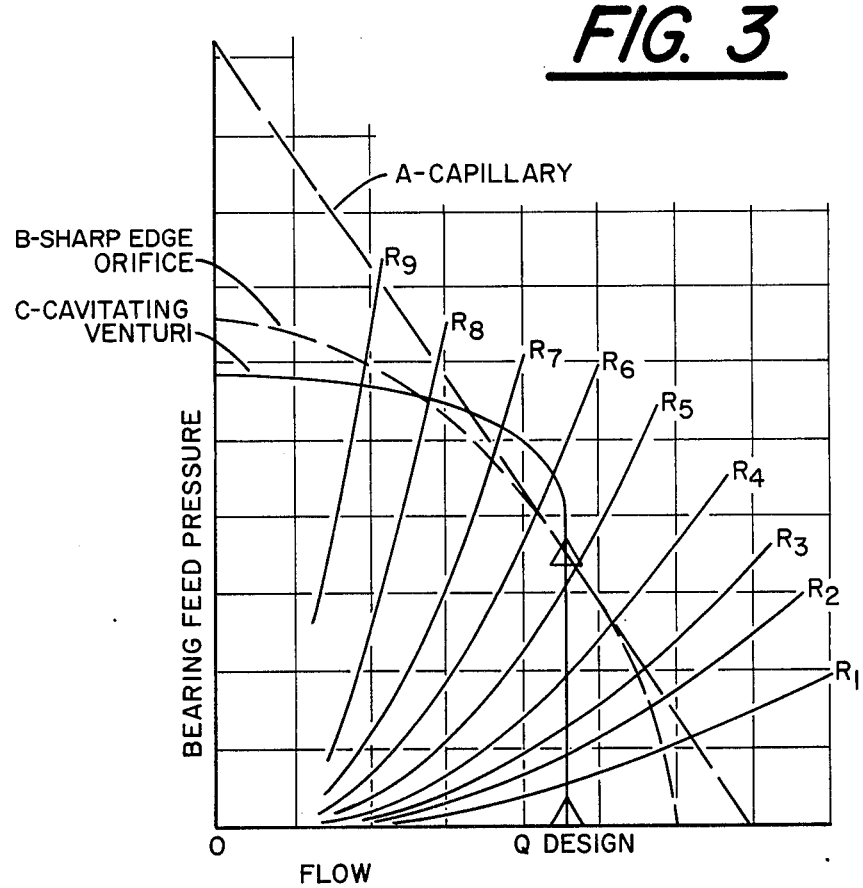
FIG. 4 is a graph of bearing feed pressure versus flow rates for a capillary, sharp edged orifice and a cavitating venturi.

FIG. 4 is a graph of bearing feed pressure versus flow rate. A series of system resistance lines labeled R1 through R9 are drawn to show the various system resistance levels at given flow rates and pressures. Again, the lines are drawn for a capillary, a sharp edged orifice and a cavitating venturi labeled A through C, respectively. Again, it may be seen that only the cavitating venturi maintains a design flow rate over a wide range of bearing feed pressures. Additionally, it may be seen that even at very low flow rates that the cavitating venturi requires less bearing feed pressure to achieve flow than either of the sharp edged orifice or the capillary. Additionally, it may be seen that there is an area where the cavitating venturi has constant flow while the bearing feed pressure varies over a wide region. In this same bearing feed pressure region the capillary and sharp edged orifice both have flow rates either exceeding or being less than the desired flow rate. The curves are all drawn to a point of intersection at the design pressure and flow rate. It can be seen, however, that should there be any change in the bearing feed pressure that both the capillary and the sharp edged orifice would immediately deviate from the design flow rate whereas the cavitating venturi can accept the pressure change without deviation in the flow rate.

Although not particularly clear in FIG. 2, the edge between the inlet cone of the venturi and the throat portion should be rounded to insure smooth inlet flow without undue pressure loss.

The bearings as used herein may be a babbit type bearing having a pad against which the shaft rests. A pocket may be formed in the pad to receive the lubricant being supplied under pressure. Once the pocket is filled, the lubricant flows out of the pocket between the shaft and the pad to effect jacking of the shaft from the pad to allow startup or other types of operation.

The invention has been described in detail with particular reference to the preferred embodiment thereof and it will be understood that variations and modifications can be effected within the spirit and scope of the invention.

What is claimed is:

1. A feed system for supplying liquid lubricant at constant flow rates to reduce startup and low speed shaft torque in turbomachinery which comprises:
   a plurality of hydrostatic bearings for supporting a shaft;
   common means for supplying high pressure liquid lubricant through a common discharge line; and
   a plurality of cavitating venturis, one cavitating venturi connected to each hydrostatic bearing and all of said cavitating venturis being connected to receive liquid lubricant from the common discharge line for supplying liquid lubricant and for regulating the flow rate of liquid lubricant to each bearing for supporting the shaft regardless of the downstream pressure conditions acting on the bearing.

2. The apparatus as set forth in claim 1 wherein the cavitating venturi defines a conical inlet opening, a reduced diameter throat and a conical discharge opening connected in series to effectively limit the flow rate of liquid lubricant through the venturi.

3. A method of supplying liquid lubricant from a common high pressure source having a single discharge line to shaft supporting bearings for jacking the shaft from the bearings to reduce starting or low speed torque which comprises the steps of:
   supporting the shaft on a plurality of hydrostatic bearings;
   supplying liquid lubricant to the bearings from the discharge line to displace the shaft from the bearings; and
   regulating the volume flow rate of liquid lubricant to provide a minimum flow of lubricant to each bearing regardless of the flow resistance characteristics of said bearing by passing the lubricant through a separate cavitating venturi for each bearing.

* * * * *